United States Patent
Andrews et al.

(10) Patent No.: US 10,515,226 B2
(45) Date of Patent: Dec. 24, 2019

(54) SYSTEMS AND METHODS FOR PROTECTED LOCAL BACKUP

(71) Applicant: Dell Products, L.P., Round Rock, TX (US)

(72) Inventors: Carlton A. Andrews, Austin, TX (US); Joseph Kozlowski, Hutto, TX (US)

(73) Assignee: Dell Products, L.P., Round Rock, TX (US)

( * ) Notice: Subject to any disclaimer, the term of this patent is extended or adjusted under 35 U.S.C. 154(b) by 153 days.

(21) Appl. No.: 15/357,005

(22) Filed: Nov. 21, 2016

(65) Prior Publication Data

US 2018/0144149 A1 May 24, 2018

(51) Int. Cl.
*G06F 21/62* (2013.01)
*G06F 16/178* (2019.01)
*G06F 16/182* (2019.01)
*G06F 11/14* (2006.01)
*G06F 21/78* (2013.01)

(52) U.S. Cl.
CPC ...... *G06F 21/6218* (2013.01); *G06F 11/1446* (2013.01); *G06F 11/1451* (2013.01); *G06F 11/1469* (2013.01); *G06F 16/178* (2019.01); *G06F 16/1844* (2019.01); *G06F 21/6209* (2013.01); *G06F 21/78* (2013.01); *G06F 2201/80* (2013.01); *G06F 2201/805* (2013.01); *G06F 2201/82* (2013.01)

(58) Field of Classification Search
CPC .. G06F 21/6218; G06F 21/78; G06F 2201/80; G06F 2201/805; G06F 2201/82; G06F 21/6209; G06F 11/1451; G06F 11/1469; G06F 17/30174; G06F 17/30215
See application file for complete search history.

(56) References Cited

U.S. PATENT DOCUMENTS

| 5,341,499 A * | 8/1994 | Doragh ............ G06F 17/30106 707/E17.01 |
| 5,677,952 A * | 10/1997 | Blakley, III ............ G06F 21/31 380/28 |
| 6,993,603 B2 * | 1/2006 | Pudipeddi ............ G06F 9/4411 707/999.001 |
| 7,523,149 B1 * | 4/2009 | Sridharan ............ G06F 11/1456 |

(Continued)

OTHER PUBLICATIONS

H. Balinsky, D. S. Perez and S. J. Simske, "System Call Interception Framework for Data Leak Prevention," 2011 IEEE 15th International Enterprise Distributed Object Computing Conference, Helsinki, 2011, pp. 139-148. (Year: 2011).*

(Continued)

*Primary Examiner* — Kari L Schmidt
(74) *Attorney, Agent, or Firm* — Fogarty LLP

(57) ABSTRACT

Systems and methods for protected local backup. In an illustrative, non-limiting embodiment, an Information Handling System (IHS) may include one or more processors and a memory coupled to the one or more processors, the memory including program instructions stored thereon that, upon execution by the one or more processors, cause the IHS to: receive, via a file system filter driver, a request targeting a file system within a storage device, wherein the file system filter driver is owned by a backup application; and reject the request, via the file system filter driver, in response to the request having been issued by an application other than the backup application.

20 Claims, 2 Drawing Sheets

(56) References Cited

U.S. PATENT DOCUMENTS

| | | | | |
|---|---|---|---|---|
| 7,600,133 B2* | 10/2009 | Long | ............... | G06F 21/6209 707/999.202 |
| 7,822,726 B1* | 10/2010 | Cardin | ............... | G06F 11/1435 707/702 |
| 8,078,805 B1* | 12/2011 | Smirnov | ............... | G06F 13/102 711/103 |
| 8,099,605 B1* | 1/2012 | Billsrom | ............... | G06F 11/1448 713/187 |
| 9,350,748 B1* | 5/2016 | McClintock | ............... | H04L 63/1408 |
| 10,298,598 B1* | 5/2019 | McClintock | ............... | H04L 63/1416 |
| 2002/0040451 A1* | 4/2002 | Harris | ............... | G06F 11/006 714/42 |
| 2005/0177539 A1* | 8/2005 | Goodwin | ............... | G06F 17/30067 |
| 2006/0101476 A1* | 5/2006 | Robert | ............... | G06F 11/3688 719/328 |
| 2006/0190502 A1* | 8/2006 | Long | ............... | G06F 11/1435 |
| 2007/0277010 A1* | 11/2007 | Anand | ............... | G06F 11/1458 711/162 |
| 2009/0193524 A1* | 7/2009 | Shoji | ............... | G06F 21/10 726/27 |
| 2011/0314279 A1* | 12/2011 | Ureche | ............... | H04L 9/3228 713/167 |
| 2012/0254999 A1* | 10/2012 | Sallam | ............... | G06F 21/566 726/23 |
| 2012/0255001 A1* | 10/2012 | Sallam | ............... | G06F 21/566 726/23 |
| 2012/0255002 A1* | 10/2012 | Sallam | ............... | G06F 21/566 726/23 |
| 2013/0276110 A1* | 10/2013 | Dalcher | ............... | G06F 21/554 726/23 |
| 2013/0333040 A1* | 12/2013 | Diehl | ............... | G06F 9/46 726/24 |
| 2015/0220737 A1* | 8/2015 | Rothman | ............... | G06F 21/572 726/1 |
| 2017/0149787 A1* | 5/2017 | Niemela | ............... | G06F 21/566 |
| 2018/0268145 A1* | 9/2018 | Teshome | ............... | G06F 21/572 |

OTHER PUBLICATIONS

Tian, Dave Jing, et al. "Provusb: Block-level provenance-based data protection for usb storage devices." Proceedings of the 2016 ACM SIGSAC Conference on Computer and Communications Security. ACM, 2016. (Year: 2016).*

* cited by examiner

SYSTEMS AND METHODS FOR PROTECTED LOCAL BACKUP

FIELD

The present disclosure generally relates to Information Handling Systems (IHSs), and, more particularly, to systems and methods for protected local backup.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In today's fast-paced world, backing up of electronic files and data is of the utmost importance. At any given time, these files and data may be subject to theft, natural disasters, accidental deletion, etc. To prepare for these types of events, a backup strategy may be put in place. Generally speaking, there are many different ways to backup data, and any form of backup typically reduces the risk of loss.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include Random Access Memory (RAM), one or more processing resources such as a Central Processing Unit (CPU) or hardware or software control logic, ROM, and/or other types of nonvolatile memory. Additional components of the information handling system may include one or more disk drives, one or more network ports for communicating with external devices as well as various Input and Output (I/O) devices, such as a keyboard, a mouse, touchscreen and/or a video display. The IHS may also include one or more buses operable to transmit communications between the various hardware components. Further, the IHS may include telecommunication, network communication, and video communication capabilities.

SUMMARY

Embodiments of systems and methods for protected local backup are described. In an illustrative, non-limiting embodiment, an Information Handling System (IHS) comprises one or more processors and a memory coupled to the one or more processors, the memory including program instructions stored thereon that, upon execution by the one or more processors, cause the IHS to: receive, via a file system filter driver, a request targeting a file system within a storage device, wherein the file system filter driver is owned by a backup application; and reject the request, via the file system filter driver, in response to the request having been issued by an application other than the backup application.

In various implementations, the file system filter driver may be part of a filter driver stack implemented by an Operating System (OS). The filter driver stack may include an encryption filter driver, and the OS is configured to load the encryption filter driver before loading the file system filter driver.

For example, storage device may be coupled to the IHS via a Universal Serial Bus (USB) port. The file system filter driver is applied to all storage devices belonging to a same class of devices as the storage device, additionally or alternatively, the file system filter driver may be applied only to the storage device, and not applied to another storage device in a same class of devices as the storage device.

In some cases, the request may be a write request. The program instructions, upon execution, may cause the IHS to signal the OS the write request has been honored. Additionally or alternatively, the IHS may reject any write request issued by any application other than the backup application. Additionally or alternatively, the IHS may allow another write request issued by the OS.

In other cases, the request may be a read request. In those situations, the IHS may allow another read request in response to the other read request having been issued by a selected application other than the backup application. Whether the request is a write or read request, it may be issued under control of a user having administrative privileges, independently of any other access control feature.

In another illustrative, non-limiting embodiment, a method may implement one or more of the aforementioned operations. In yet another illustrative, non-limiting embodiment, a memory device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
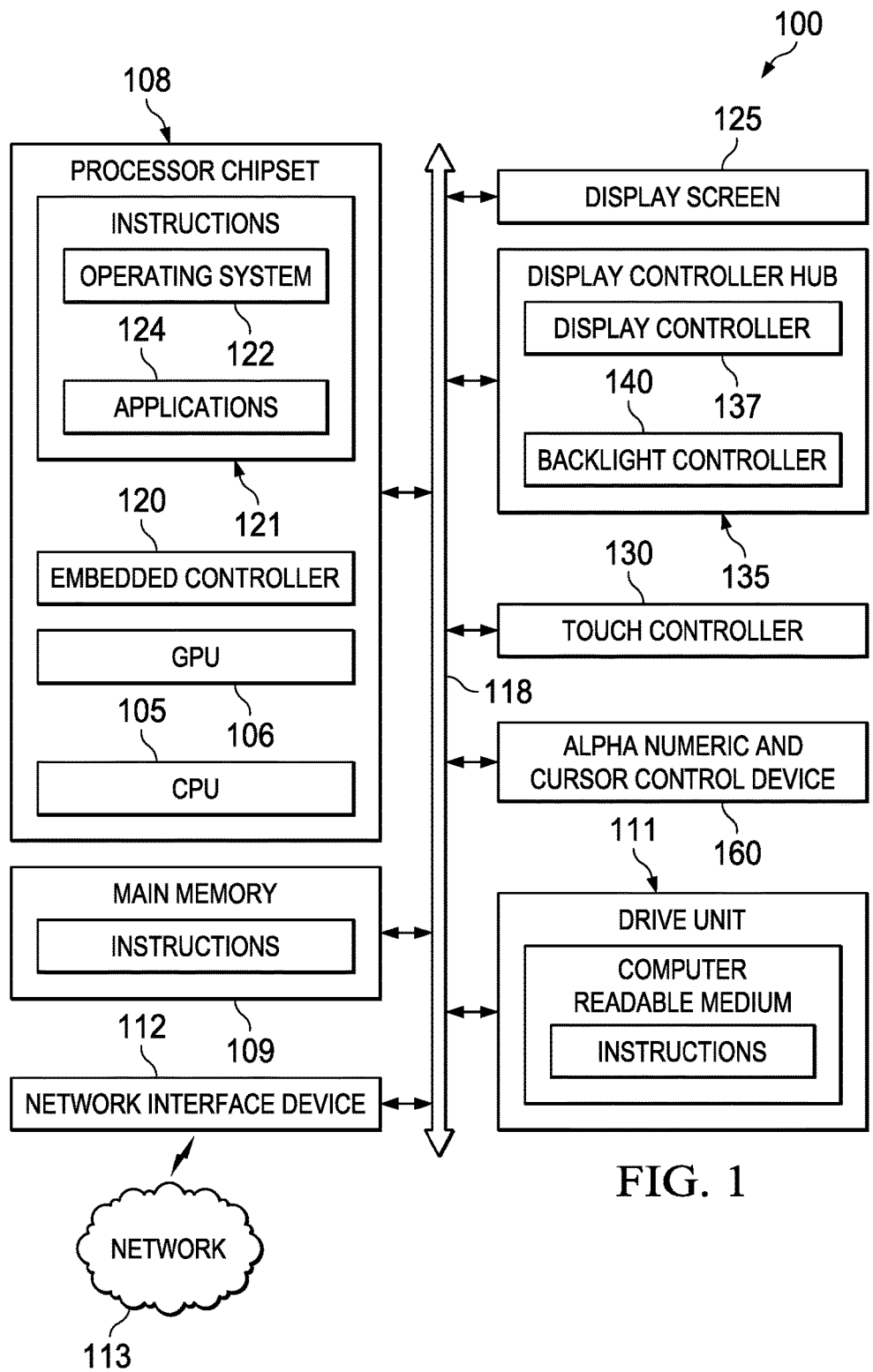
FIG. 1 is a diagram of an example of an Information Handling System (IHS) configured to provide protected local backup according to some embodiments.

Malware and "ransomware" threats have evolved and multiplied over the last several years. These threats, also generally referred to as "computer viruses," typically seek to hold hostage (or destroy) data, including any backed-up data, if that data is stored in a device that is mounted or accessible through standard network protocols.

When a receiving storage device is provided by on a server or cloud-based service, the server may execute an intelligent service that receives the data, handshakes with the client product delivering the data, duplicates the data, archives earlier copies, optimizes storage, etc. There is normally a proprietary optimized protocol between the client which sends the data to be stored and the receiver that puts away the data copies. The malware or ransomware does not know how to traverse this protocol to corrupt the data behind the communications tunnel. Even if it did, the commands to corrupt the historic data through this channel most likely will not exist.

However, the foregoing services are typically provided only by larger enterprise data center backup "receivers" and hosted backup services. Consumers, small businesses, and individual corporate employees responsible for their own backup tend to use client-only software that makes copies of data on a Universal Serial Bus (USB)-attached hard disk or network-attached storage (NAS). These backup shares are directly accessible to the backup software but also are visible as part of a standard Operating System (OS) file system.

Even if the data store is obfuscated or encrypted, it is not safe from ransoming encryption or destruction if it is accessible to software running on the infected client machine or any other machine sharing access to the backed up data. Any historical backup also online can be overwritten. Protection via an OS's write-protect access control features is generally not effective because most users operate with administrator privileges, which allows the malware to be installed.

To address these, and other problems, systems and methods described herein may provide, for example, a file system filter driver that may be attached to a specific device (whether directly attached or networked), and not just to an entire class of devices. Examples of system filter drivers are present, for instance, in commercially available products such as DELL's "Dell Data Protection" (DDPE) solutions, which are capable of interfacing with a disk or other storage device through a file system filter driver that encrypts data written to the disk or decrypts data read from the disk.

In several OS implementations, there is a specific order (as in a stack) in which filter drivers are loaded. For example, an encryption filter driver may act upon outgoing data before implementations of the filter drivers described herein are loaded.

In various embodiments, a file filter driver as described herein may be placed at the lowest possible level in the stack. The filter may be owned by a backup application, and/or attached to a specific attached or mounted file system. In operation, the filter driver may be configured to reject any data written to that device from any level (or filter driver) placed above it, for instance, by not passing on those write requests. In some cases, however, the filter driver may selectively decide if one or more read requests should be honored or not.

Moreover, the filter driver may block all data written to an attached file system except data written to it by the very backup application or service that controls that file system. Data may be written directly to the file system thought the filter driver by its controlling backup process, and that close coupling may reduce the chances that another process can masquerade as the backup service. Generally speaking, exceptions may be made as needed to permit certain selected or essential OS-owned services and/or operations to pass through the filter, but may be minimized to present the smallest possible attack profile.

Turning now to FIG. 1, a diagram of an Information Handling System (IHS) 100 configured to provide systems and methods for provide protected local backup is depicted. In various embodiments, IHS 100 may include a set program instructions that can be executed to cause IHS 100 to perform any one or more of the methods or operations disclosed herein.

In various environments, IHS 100 may be implemented using electronic devices that provide voice, video or data communications. Further, while a single IHS 100 is illustrated, the term "system" shall also be taken to include any collection of systems or sub-systems that individually or jointly execute a set, or multiple sets, of instructions to perform one or more computer operations.

IHS 100 includes main memory 109, one or more processing resources such as a Central Processing Unit (CPU) 105 or hardware or software control logic, and operates to execute code. Additional components of IHS 100 may include one or more storage devices such as static memory or disk drives 111. These memory devices 109 and/or 111 can store code and data. In various embodiments, devices 109 and/or 111 may be implemented using any suitable memory technology, such as static RAM (SRAM), synchronous dynamic RAM (SDRAM), nonvolatile/Flash-type memory, or any other type of memory.

In various embodiments, devices 109 and/or 111 may include one or more files systems. As used herein, the term "files system" refers to systems and data structures that an OS uses to keep track of "files" on a given disk or partition; that is, the way the files are organized on the disk. As such, a file system is used to control how data is stored and retrieved, and each group of data is called a "file." For example, a file system may separate the data into pieces. By giving each piece a name, the information can then be identified. In other words, the structure and logic rules used to manage the groups of information and their names is called a "file system".

There are various types of file systems in use today. Each may have its own different structure and logic, properties of speed, flexibility, security, size, etc. Some file systems have been designed to be used for specific applications (for example, the ISO 9660 file system is designed specifically for optical discs). Moreover, file systems can be used on numerous different types of storage devices that use different kinds of media and devices, such as devices 109 and/or 111.

In various implementations, storage device 111 may be an internal or external device coupled to IHS 100 via a local bus or port. For example, such a bus or port may include implementations of various version of the Universal Serial Bus (USB) protocol. Additionally or alternatively, storage device 111 may include a Common Internet File System (CIFS) and/or Network-attached storage (NAS).

Other components of IHS 100 may include one or more communications ports for communicating with external devices as well as various input and output (I/O) devices. I/O devices may include alphanumeric and cursor control devices 160 such as a keyboard, a touchpad, a mouse, one or more video display devices 125, display touchscreen(s) with touch controllers 130, etc. IHS 100 may also include one or more buses 118 operable to transmit communications between the various hardware components.

Again, IHS 100 may include one or more processing resources such as CPU 105, Graphics Processing Unit (GPU) 106 that may or may not be integrated with CPU 105, and related chipset(s) 108 or hardware or software control logic.

In various embodiments, IHS 100 may be a single-processor system including one CPU or a multi-processor system including two or more CPUs (e.g., two, four, eight, or any other suitable number). CPU(s) 105 may include any processor capable of executing program instructions. For example, in various embodiments, CPU(s) 105 may be general purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 105 may commonly, but not necessarily, implement the same ISA.

IHS 100 may include several sets of instructions 121 to be run by CPU 105, GPU 106, and/or any embedded controllers 120 on IHS 100. One such set of instructions includes Operating System (OS) 122 with an OS interface.

Example OSs 122 can include those used with typical mobile computing devices such as Windows Phone mobile OS from MICROSOFT CORPORATION and Android OS from GOOGLE, INC. Additional sets of instructions in the form of multiple software applications 124 may be run by IHS 100. These applications 124 may enable multiple uses of IHS 100.

IHS 100 may operate as a standalone device or may be connected to other computer systems or peripheral devices. IHS 100 can represent a server device whose resources can be shared by multiple client devices, or it can represent an individual client device, such as an individual mobile personal computing system.

Network interface device 112 may include a wireless cellular or mobile networks (CDMA, TDMA, etc.), WIFI, WLAN, LAN, or similar network connection, enabling a user to communicate via a wired or wireless communications network 113, such as the Internet. IHS 100 may be configured with conventional web browser software. The web browser may include for example MICROSOFT COR-PORATION'S Internet Explorer web browser software, Firefox or similar such browsers to allow the user to interact with websites via network 113.

IHS 100 also includes one or more display devices 125 that may utilize LCD, OLED, or other thin film technologies. Each display device 125 may be capable of touch input via touch controller 130. Each display device 125 has a display controller hub 135. The display controller hub 135 may include control logic and software or access separate control logic and software. Components may include a display controller or driver 137 and a backlight controller 140 for LCD thin film display technologies or a brightness controller for OLED/AMOLED technologies. The one or more parts of the display controller hub 135 may be operated by or integrated with one or more graphics processing units (GPUs) 106 such as those that are part of the chipset 108. Display device 125 and one or more parts of display controller hub 135 may also be controlled by embedded controller 120 of chipset 108. Each GPU 106 and display controller/driver 137 is responsible for rendering graphics such as software application windows and virtual tools on display device 125.

As described above, OS 122 in IHS 100 of FIG. 1 may include or make use of a file system filter driver as described herein, which may be placed at a selected level (e.g., the lowest possible level) in the driver filter stack. As such, IHS 100 may take advantage or a methodology for continuously attached backup storage that my leverage standard attached and mounted file systems utilizing common protocols, may be used by any service once attached to the file driver, and/or does not require additional intelligence on the backup device.

Backup applications or services are computer programs used to perform backup; they create supplementary copies of data stored in files, databases, and/or entire IHSs. These programs may later use the supplementary copies to restore the original contents in the event of data loss. In some cases, any of the many backup applications or services that are commercially available may be executed by IHS 100. And, in some cases, a backup application or service may be modified, adapted, or created to perform techniques described herein.

Figure 2:
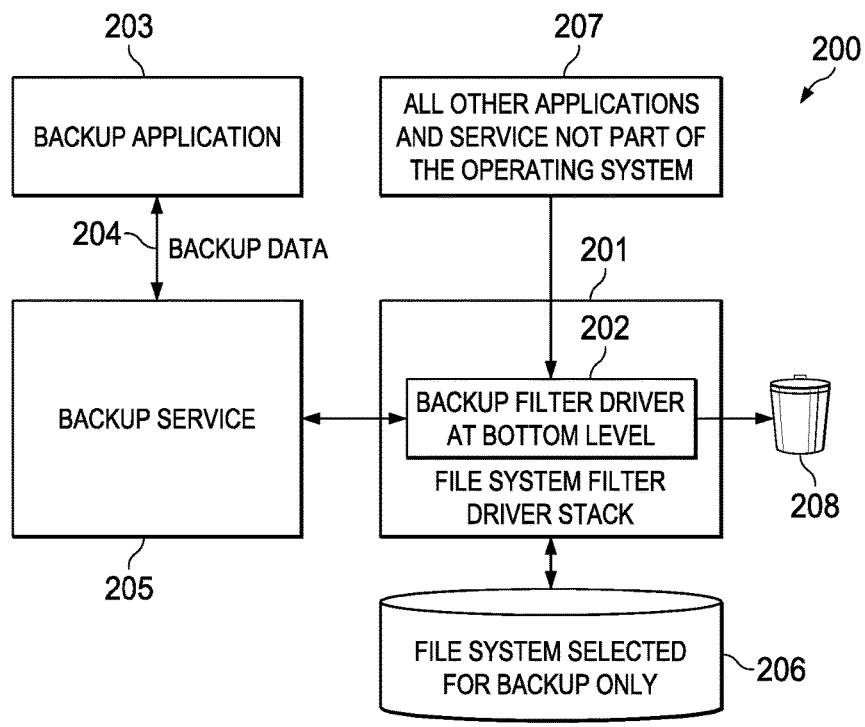
FIG. 2 is a diagram of a file system filter driver configured to provide protected local backup according to some embodiments.

To better illustrate the foregoing, FIG. 2 shows a diagram of a file system filter driver configured to provide protected local backup according to some embodiments. As shown, file system filter driver stack 201 may be provided by an OS as part of its file system and/or related functions.

As used herein, the term "file system filter driver" or "filter driver" refers to a kernel-mode component that runs as part of an OS (e.g., the WINDOWS' executive). A file system filter driver can filter I/O operations for one or more file systems or file system volumes present in a storage device. (This is in contrast with a "device driver" which, despite the similar nomenclature, is an entirely distinct component that controls the particular hardware I/O device itself, as opposed to a file system stored thereon.) In other words, a file system filter driver works in conjunction with one or more file systems to manage file I/O operations.

Typical applications for conventional file system filter drivers include antivirus utilities, encryption programs, and hierarchical storage management systems. As described herein, however, a file system filter driver may also be modified or created specifically for facilitating protected backup operations, particularly when performed with respect to file systems or volumes that are locally disposed with respect to the IHS, and therefore may not always have access to a remote or backup solutions provided by third-parties.

As such, file system driver stack 201 implemented by OS 122 includes file system filter driver 202, also referred to as a "backup filter driver," located at or near the bottom of stack 201. For instance, in some cases, another filter driver may be used specifically to perform data encryption and/or decryption. In those cases, backup filter driver 202 may be loaded by the OS after (that is, in a position lower than the position of) such an encryption filter driver in stack 201.

In various embodiments, backup filter driver 202 may be configured to process write or read requests, to receive data to be written to volume or file system 206, and/or to read backup data already stored in volume or file system 206. In some cases, file system 206 may be dedicated for use for data backup operations only, which may be stored, for example, in storage device 111.

In order to perform backup operations, IHS may execute backup application 203, which may be configured to identify data 204 to be backed-up by IHS 100 and may send that data to backup service 205 being run by the OS. In some cases, a user may select certain volumes, folders, or files to be backed-up, and/or it may use rules to independently or automatically select data to be backed up. These settings may be selected or provided, for example, by a user operating IHS 100.

Backup service 205 passes data 204 through file system driver stack 201, including filter driver 202. If filter driver 202 allows the data or write request to pass, it may communicate the data to file system 206. Conversely, if filter driver 202 does not allow the data or write request to pass through, it may prevent the data from reaching file system 206.

In operation, IHS 100 may execute a number of other software applications, including applications or services 207 that are not part of OS 122. Backup application 203 is uniquely coupled or tied to filter driver 202, so that filter driver 202 allows only write request originated by application 203 to reach file system 206. In some implementations, write requests issued by any other application or service 207 are rejected by filter driver 202 and discarded in trash or folder 208; even when the user of the IHS has administrative privileges and is logged into the OS as such. That is, filter driver 202 may operate independently of conventional OS access control features.

In some cases, filter driver 202 may spoof another application or service 207 to cause the application or service to believe that its request has been fulfilled and data has been written to file system 206, when in reality the request is, was, or will be rejected.

In various implementations, filter driver 202 may accommodate exceptions for selected write requests issued by certain OS components. In those cases, in addition to write requests issued by backup application 203, filter driver 202 may also accept write requests issued by those selected components. Moreover, filter driver 202 may also accommodate exceptions for selected write requests issued by applications other than backup application 203. It should be noted, however, that the exceptions may typically be kept small or to a minimum in order to afford better backup data protection.

With respect to read requests, in some cases filter driver 202 may allow any such requests targeting volume or file system 206 to be fulfilled regardless of which application or server has issued that read request. In other cases, read requests targeting file system 206 may be restricted in ways similar to the write requests described above.

It should be noted that, generally speaking, a hardware device has a device name and belongs to a class. The device name uniquely identifies an individual hardware device, whereas the device class represents a type of device (e.g., a DVD/CD-ROM drive class, a disk drive class, etc.).

In some situations, file system filter driver 202 may be installed for an entire storage device class. In other situations, filter driver 202 may be applied only to a specific device, and not applied to other storage devices belonging to the same class. In yet other situations, file system filter driver 202 may be applied to a particular or selected file system stored in a given storage device, and not applied to other file systems or volumes in that same storage device.

Figure 3:
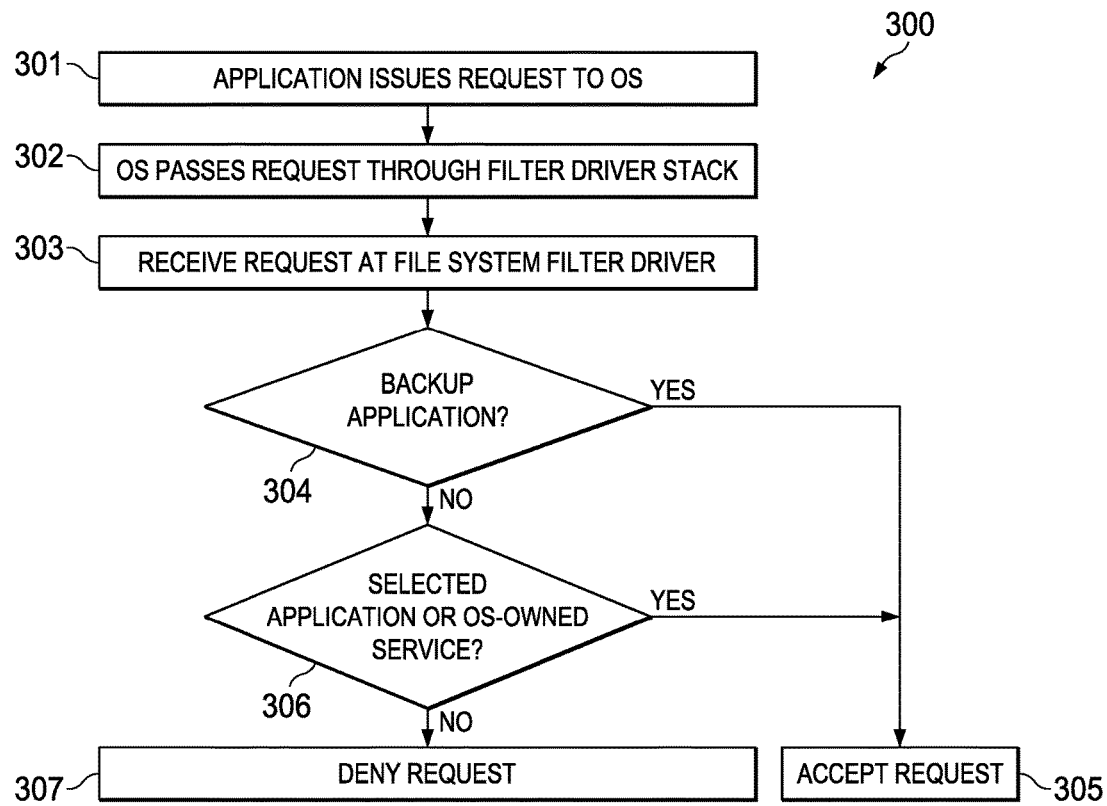
FIG. 3 is a flowchart of an example of a method for providing protected local backup according to some embodiments.

Turning now to FIG. 3, a flowchart of an example of a method for providing protected local backup is described. In some embodiments, method 300 may be performed, at least in part, by file system filter driver 202 in cooperation with OS 122 and/or backup application 203.

At block 301, any application or service issues an access request to the OS. For example, the application may issue a write or read request targeting data to be stored in or retrieved from a given file system located in a given storage device. At block 302, the OS passes the request through filter driver stack 201 until it reaches backup file system filter driver 202 at block 303. At block 304, filter driver 202 determines whether the request has been issued by the backup application 203 that owns that filter driver. If so, the request is allowed to reach file system 206 at block 305. Otherwise, block 306 determines whether the request was issued by a selected application or OS-owned service that has been excepted from filter driver 202. If so, again the request may be accepted at block 305, otherwise the request is denied or rejected at block 307.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
one or more processors; and
a memory coupled to the one or more processors, the memory including program instructions stored thereon that, upon execution by the one or more processors, cause the IHS to:
receive, via a file system filter driver located at the lowest level of a filter driver stack implemented by an Operating System (OS) executed by an Information Handling System (IHS), a first request and a second request targeting a file system within a storage device coupled to the IHS via a Universal Serial Bus (USB) port, wherein the file system filter driver is owned by a backup application, wherein the filter driver stack includes an encryption filter driver, and wherein the OS is configured to load the encryption filter driver before loading the file system filter driver;

in response to the first request being a write request issued by any application other than the backup application, provide to the application, by the file system filter driver, an indication that the write request was fulfilled and reject the write request; and in response to the second being a read request issued by a selected application other than the backup application, allow the read request.

2. The IHS of claim 1, wherein the storage device is coupled to the IHS via a Universal Serial Bus (USB) port.

3. The IHS of claim 1, wherein the file system filter driver is applied to all storage devices belonging to a same class of devices as the storage device.

4. The IHS of claim 1, wherein the file system filter driver is applied only to the storage device, and not applied to another storage device in a same class of devices as the storage device.

5. The IHS of claim 1, wherein the program instructions, upon execution, further cause the IHS to allow another write request issued by the OS.

6. The IHS of claim 1, wherein at least one of the first or second requests is issued by a user with administrative privileges.

7. A memory device having program instructions stored thereon that, upon execution by an Information Handling System (IHS), cause the IHS to:

receive, via a file system filter driver located at the lowest level of a filter driver stack implemented by an Operating System (OS) executed by an Information Handling System (IHS), a first request and a second request targeting a file system within a storage device coupled to the IHS via a Universal Serial Bus (USB) port, wherein the file system filter driver is owned by a backup application, wherein the filter driver stack includes an encryption filter driver, and wherein the OS is configured to load the encryption filter driver before loading the file system filter driver;

in response to the first request being a read request issued by a selected application other than the backup application, allow the read request; and in response to the second request being a write request issued by any application other than the backup application, provide to the application, by the file system filter driver, an indication that the write request was fulfilled and reject the write request.

8. The memory device of claim 7, wherein the file system filter driver is applied to all storage devices belonging to a same class of devices as the storage device.

9. The memory device of claim 7, wherein the file system filter driver is applied only to the storage device, and not to another storage device in a same class of devices as the storage device.

10. The memory device of claim 7, wherein the storage device is coupled to the IHS via a Universal Serial Bus (USB) port.

11. The memory device of claim 7, wherein the file system filter driver is applied to all storage devices belonging to a same class of devices as the storage device.

12. The memory device of claim 7, wherein the file system filter driver is applied only to the storage device, and not applied to another storage device in a same class of devices as the storage device.

13. The memory device of claim 7, wherein the program instructions, upon execution, further cause the IHS to allow another write request issued by the OS.

14. The memory device of claim 7, wherein at least one of the first or second requests is issued by a user with administrative privileges.

15. The memory device of claim 7, wherein the storage device is coupled to the IHS via a Universal Serial Bus (USB) port.

16. A method, comprising:

receiving, via a file system filter driver located at the lowest level of a filter driver stack implemented by an Operating System (OS) executed by an Information Handling System (IHS), a first request and a second request targeting a file system within a storage device coupled to the IHS via a Universal Serial Bus (USB) port, wherein the file system filter driver is owned by a backup application, wherein the filter driver stack includes an encryption filter driver, and wherein the OS is configured to load the encryption filter driver before loading the file system filter driver;

in response to the first request being a write request issued by any application other than the backup application, providing to the application, by the file system filter driver, an indication that the write request was fulfilled and rejecting the write request; and in response to the second request being a read request issued by a selected application other than the backup application, allowing the read request.

17. The method of claim 16, wherein the file system filter driver is applied to all storage devices belonging to a same class of devices as the storage device.

18. The method of claim 16, wherein the file system filter driver is applied only to the storage device, and not applied to another storage device in a same class of devices as the storage device.

19. The method of claim 16, wherein the program instructions, upon execution, further cause the IHS to allow another write request issued by the OS.

20. The method of claim 16, wherein at least one of the first or second requests is issued by a user with administrative privileges.

* * * * *